D. L. Latourette,
Oil Press.
No. 250. Reissued Nov. 22, 1853.
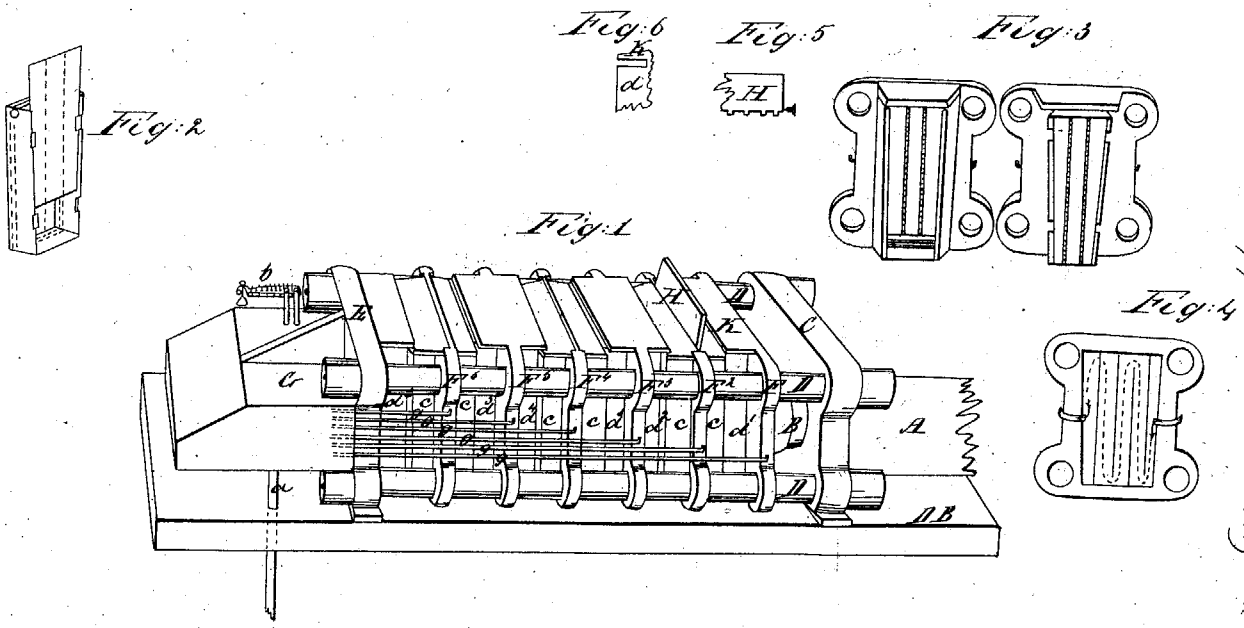
N. PETERS, PHOTO-LITHOGRAPHER, WASHINGTON, D. C.

UNITED STATES PATENT OFFICE.

DAVID L. LATOURETTE, OF ST. LOUIS, MISSOURI.

IMPROVEMENT IN OIL-PRESSES.

Specification forming part of Letters Patent No. 8,469, dated October 28, 1851; Reissue No. 250, dated November 22, 1853.

*To all whom it may concern:*

Be it known that I, DAVID L. LATOURETTE, of the city and county of St. Louis, and the State of Missouri, have invented useful and new Improvements in Oil-Presses, the same being for manufacturing linseed, lard, castor, and other oils, and for other purposes; and I do hereby declare that the following is a full description of the same, reference being had to the accompanying drawings, with their letters of reference, making a part of this specification.

My improvements are shown in connection with a hydraulic press, (the pumps not being shown;) but they are equally applicable to other description of presses.

Figure 1 is a perspective view of the general arrangement of a complete machine. The other figures are illustrative of details.

The letters in all the figures are the same.

A is the cylinder of a hydraulic press, the ram of which, B, works in a horizontal line, or nearly so. The back head, E, receives the pressure, and is attached to the lugs C of the pressing-cylinder A by the large rods D D D D. These rods, which sustain the whole pressure, are also conveniently used as guides for the plates. Between ram B and back head, E, and within the rods D, I arrange a succession of pressing-plates, $F' F^2 F^3 F^4 F^5 F^6$, which are arranged so as to form a series of chambers for the reception of the substances to be acted upon by the press, and a series of chambers for the reception of steam or its equivalent by means of which the plates may be heated and the substance exposed to any desirable temperature while pressing. The plates are placed in the press in a vertical position, or nearly so, in order to facilitate the filling of the chambers and the discharge of the cake or refuse after the oil is expressed, and also to secure vertical channels through which the oil can discharge itself as it comes from the substance pressing. The plates stand on the rods D by means of bracket-arms, which span the rods, so that the movement of the plates is regulated and guided exactly in line. On the face of the plates projections are raised (see C C C, Fig. 3) which form the sides and bottom of the chamber for the substance, and on the opposite plate projection *d* presents itself as a follower, and works inside of C C C when the plates are driven together by the action of the ram. The top of the chamber at which the substance enters is closed by door H, which works under cap K. This cap puts out from the plate above follower *d*, and is of sufficient strength to hold the door firmly closed. This door is provided with hinges, and has projecting lugs (see Fig. 5) which enter, when the lid closes, corresponding holes under the cap to prevent the pressure from underneath straining the hinges or raising the door at the back part. The bottom of the chamber may be open for the exit of the cakes, and closed with a door and cap in the same manner; and if, for any purpose, it would be convenient to have access to the chamber at the side, the opening can be closed in the same manner.

In Fig. 1 the doors are all represented closed except one, H, which is raised ready for the charge to be inserted. The steam-chamber is formed in the interior of the plate, and is separated into divisions by partitions or columns. (See Fig. 4.) These are put in to connect the shells and support them from being crushed by the pressure to which they are subjected. Steam is communicated to these chambers by means of side tubes attached to the out edge of the plates in the form of an elbow; and in order to allow the plates to work forward and backward these tubes communicate with a steam reservoir or chest, G, through stuffing-boxes; or, instead of having these tubes all work into a common reservoir, they may be varied in size and work one into another, like the joints of an adjustable telescope, each joint being provided with a stuffing-box. The chambers for the substance are made wider at one end than the other in order that the cakes may be easily dislodged. It is also provided with grooves or channels for the discharge of the oil, (see dotted lines, Fig. 3,) and covering these chambers and forming a complete lining for the chamber is a sheet-iron case. This lining (see Fig. 2) is so made that the oil will pass out into the discharge-channels, while the refuse is retained as cake. It may be used detached from the chamber, as shown in the figure, and withdrawn with the cake, or it may be fixed in the chamber and the cake removed alone. This lining, which I will call a "metallic filterer," is made in the following manner: I first procure the sheet-iron, rolled to the requisite thickness—say, one-quarter of an inch—and true it by hammering. It is then grooved where the perforations are to be made, so that there is but a thin shell of metal for the perforating-tool to penetrate. The grooving may be done on a plainer or with a rotary cutter. The perforations are now made with a drill or punch one-sixteenth of an inch in diameter. Afterward the burr, which is raised by the perforating-tool, is hammered back instead of being filed off, so that it partly closes the hole and leaves it very ragged. The face is then ground off and polished on an emery-wheel, so that nothing will stick to the surface. These linings are found to filter the oil in a superior manner. The plates are made of cast-iron in dry sand, complete in all their parts, the chambers being formed with cores. The doors are made of wrought-iron, and finished as smooth as a slide-valve. Care should be observed in making the plates to have their shells of equal thickness, in order that their parts may expand and contract equally when being heated or suffered to cool. The plates can be worked cold by shutting off the steam by a valve provided for the purpose.

The action of the press is very simple. Ram B is driven forward by the force-pumps, and the first plate slides before it on the guide-rods D D D D. Its follower *d* enters the first chamber inside of *c c c* and compresses the substance, and on meeting with some resistance the next plate is driven upon its neighbor, and so on to the end, when all are concentrated upon back head, E, the pipes passing into their stuffing-boxes and adjusting themselves to the movement of the plates, so that the steam-connection is not broken in any stage of pressing. When the pressing is finished, the ram is returned to its place in the cylinder and drags the plates back after it, and by means of links or chains they are distributed to their places. The cakes are then discharged and the chambers refilled. The ram may be returned to its place by means of a steam-cylinder piston and piston-rod, the latter taking hold of a bracket which puts out from the ram-head.

The press is worked with great rapidity and economy, and is found to gain in yield of oil about twenty per cent. over the yield of presses now in use with the same pressure per square inch. This is attributable to the free discharge given to the oil from the entire surface of the cake, and to the entire surface of the cake being exposed to heated metal while yielding its oil under pressure. The press is filled and discharged with great rapidity, no handling of the substance or use of mats or bags being required.

I claim as my invention—

1. The pipes sliding into and out of stuffing-boxes, in combination with the pressing-plates, for the purposes and in the manner set forth.

2. In combination with the pressing-plates, the complete boxes or cases formed on the surface of the plates, as shown, where the openings to the said boxes or cases for the entrance or exit of the substance to be pressed are closed with the doors and caps, as set forth, the cap sliding over and thus securing the doors when the press is brought into action. This combination, when used in connection with a horizontal press, enables me to communicate and press the substance and discharge the refuse or cake without the use of bags or mats and without handling, and at the same time to secure a perfect and free discharge of oil from the entire surface of the cake through the metallic filterers and vertical channel.

I do not claim the arrangement in a horizontal press of a series of pressing-plates between which the substance is inserted, having been previously enveloped in strong cloths or mats; nor do I claim the arrangement in a vertical press of a series of partial cases into which the substance is inserted, having been previously enveloped in strong cloths or mats, which in both these instances are necessary to convey the substance into the press and to prevent it from pressing out laterally from between the plates in the one instance and out at the end and through the cracks in the other.

D. L. LATOURETTE.

Witnesses:
P. W. JOHNSTONE,
JOHN YOUNG.